(12) United States Patent
Gaese et al.

(10) Patent No.: US 6,349,674 B1
(45) Date of Patent: Feb. 26, 2002

(54) LITTER FOR ANIMALS AND METHOD FOR PRODUCING SUCH LITTER

(75) Inventors: Dagmar Gaese, Roesrath; Erhard Schilling; Klaus Wödy, both of Köln, all of (DE)

(73) Assignee: Raiffeisen-Warren-Zentral Rhein-Main e.G. (DE)

( * ) Notice: Subject to any disclaimer, the term of this patent is extended or adjusted under 35 U.S.C. 154(b) by 0 days.

(21) Appl. No.: 09/562,696

(22) Filed: Apr. 28, 2000

(30) Foreign Application Priority Data

Jun. 17, 1999 (EP) ............................................. 99111707

(51) Int. Cl.⁷ ............................................. A01K 29/00
(52) U.S. Cl. .................... 119/171; 100/39; 264/122
(58) Field of Search ............................. 119/171, 1, 172, 119/173; 100/39; 414/132; 264/122; A01K 29/00

(56) References Cited

U.S. PATENT DOCUMENTS

| | | | | |
|---|---|---|---|---|
| 3,946,660 A | * | 3/1976 | Kuhtreiber | 100/39 |
| 4,258,660 A | * | 3/1981 | Pris | 119/1 |
| 4,727,824 A | * | 3/1988 | Ducharme et al. | 119/1 |
| 4,810,446 A | * | 3/1989 | Sylvest | 264/122 |
| 4,827,871 A | * | 5/1989 | Morrison | 119/1 |
| 4,924,808 A | * | 5/1990 | Pirotte | 119/1 |
| 5,230,305 A | * | 7/1993 | House | 119/171 |
| 5,609,123 A | * | 3/1997 | Luke et al. | 119/173 |
| 5,724,915 A | * | 3/1998 | Ochi et al. | 119/173 |
| 5,743,213 A | * | 4/1998 | Fujiura | 119/172 |
| 6,039,004 A | * | 3/2000 | Goss et al. | 119/172 |

FOREIGN PATENT DOCUMENTS

| | | | | |
|---|---|---|---|---|
| DE | 4201410 A1 | * | 1/1992 | A23K/1/14 |
| GB | 2252709 A | * | 8/1992 | A01K/1/015 |

* cited by examiner

Primary Examiner—Peter M. Poon
Assistant Examiner—Andrea M. Valenti
(74) Attorney, Agent, or Firm—R. W. Becker & Associates; R. W. Becker

(57) ABSTRACT

Litter for animals is provided that is comprised primarily of defibrated straw material that has been compressed or compacted into pellet or briquettes.

12 Claims, No Drawings

LITTER FOR ANIMALS AND METHOD FOR PRODUCING SUCH LITTER

BACKGROUND OF THE INVENTION

The present invention relates to litter or bedding material for animals that primarily comprises straw material that has been compressed to briquettes and/or pellets. The terms "straw" and "straw material" encompass the dry stems and leaves of grain, legumes, oleiferous plants, and other fibrous plants, especially secondary growth material.

The litter for small animals that is described in EP 0 310 016 B1 (=U.S. Pat. No. 4,924,808) comprises at least primarily pressed ground straw, the ground straw material comprising irregular fragments of ground straw briquettes. When this litter for small animals is produced, straw is ground or finely ground and the powdered straw obtained in this manner is compacted by means of pressure into ground straw briquettes that are then broken down into fragments having an irregular exterior surface.

The dust that occurs when the briquettes are being produced is harmful for animals and is sifted out, removed pneumatically, and can then be reintroduced at the compacting or briquetting station.

The following are the essential requirements for litter for animals, regardless of whether the animals are large or small:

(1) Highly absorbent for liquids
(2) High degree of liquid retention over time
(3) Low proportion of dust
(4) Easily disposed of While the known litter can be considered to satisfy the requirements specifically in items (3) and (4), there are certain drawbacks in terms of requirements (1) and (2), these drawbacks resulting from grinding the straw, in particular finely grinding the straw.

In a method described in GB 2 252 709 A for producing litter from straw for animals, the straw is chopped in a first stage and ground up by means of a hammer mill so that it can pass through, e.g., a 7–10 mm sieve. This material is compressed or pelletized in a second stage, without first removing any dust, in order then to be broken up in a third stage into a relatively narrow range of particle sizes, e.g. 1–10 mm. The granulate material thus obtained is supposed to be largely free of dust in that there are essentially no particles of dust other than the granulate material, while the individual granules can contain dust particles in addition to the chopped fibrous matter.

Known from DE 42 01 410 A is another method for producing litter from straw for animals in which chopped straw is compressed into pellets, dust particles that occur during chopping remaining in the material.

It is an object of the present invention to fabricate a litter produced with a straw base that has high absorbency and enhanced liquid retainability over time compared to known litters.

SUMMARY OF THE INVENTION

For achieving this object, the litter in accordance with the invention primarily comprises defibrated straw material that has been compacted to pellets or briquettes, whereby in accordance with a preferred embodiment of the invention dust-like straw material that occurs when the straw is defibrated is separated out prior to compacting the defibrated straw material.

The term "defibrated straw material" also encompasses a plurality of individual straw fibers that lie adjacent to each other that are also not separated or not completely separated from each other in the longitudinal direction of the fiber during the defibrating process.

While GB 2 252 709 A and DE 42 01 410 A start with chopped straw, which by definition is cut up perpendicular to the longitudinal direction of the straw fibers, in accordance with the invention defibrated straw is used in that the individual blade of straw is broken down parallel to the longitudinal direction of the fiber. In the known methods, the dust that occurs during chopping remains in the compacted or pelletized granules, while in accordance with the invention the litter primarily comprises defibrated straw, whereby in accordance with preferred embodiments of the invention, dust-like straw material that occurs during the straw defibrating process is largely separated out.

Because the straw, i.e., the blade matter, is defibrated, the majority of blade matter cells are not broken up, in contrast to the process in which the matter is ground or finely ground. This means that it is possible for the individual intact blade matter cells of the dry straw material to absorb liquid by osmosis through their semi-permeable cell wall or even by Knudsen molecular movement and they can store this liquid over a long period of time, as a result of which the ability of the straw material to retain liquids is enhanced overall.

While as a rule in litter produced largely from ground straw, which by definition has a particle size of 50 to $500\mu$ in the individual briquette or the resultant fragments of litter, the packing density of the ground particles is relatively high and the void volume is consequently relatively low, this void volume is increased when straw fibers or bundles of straw fibers are employed, which leads to an increase in the absorbency of individual pellets or briquettes or even of resultant litter fragments.

In the known litter that comprises at least primarily compacted ground straw, any straw fiber portion that may be caused by the grinding conditions and that is only present to a minor extent in the bulk of the matter does not lead to the enhanced properties in the litter in accordance with the invention.

Defibrating the straw matter used can be done physically, in particular mechanically, and/or chemically in the manner that is conventional in the manufacture of paper and/or cellulose. Dust-like straw material that occurs during straw defibrating up to a particle size of $50\mu$ can be separated out by means of sifting and/or by suctioning it off, preferably prior to compacting the fiber material. Apart from a small proportion of ground straw, which acts as a bonding agent during pelletization and/or briquetting, it is especially advantageous to separate out ground straw particles present in the defibrated straw material up to a size of about $250\mu$, if necessary also up to a size of about $500\mu$, prior to compacting the fiber material. If the straw is mechanically defibrated, e.g. through the use of edge runners, etc., it is advantageous to dry the straw to a water content of 8–14%.

In order to provide a sufficiently large absorbent surface, the maximum dimensions of the fibers or fibrous structure perpendicular to the longitudinal direction of the fiber should be no larger than 4 mm, preferably no larger than 2–2.5 mm. The length of the individual fibers or fibrous structure can be 100 mm or more, depending on initial material.

The size of the individual briquettes and/or pellets compacted from straw fiber material depends essentially on the purpose for which it is intended, either for large or small animals. For instance, the individual pellets or briquettes can have a length of up to 20–40 mm and a diameter of up to 10–15 mm, whereby it is also conceivable that they be further broken down into fragments.

The use of primarily straw fibers also ensures that material that is completely full of moisture does not tend to take on a pulpy or sludge-like consistency that makes it more difficult to remove the litter from the animal cage or stall.

The specification incorporates by reference the disclosure of European priority document EP 99 111 707.8 filed Jun. 17, 1999.

The present invention is, of course, in no way restricted to the specific disclosure of the specification and drawings, but also encompasses any modifications within the scope of the appended claims.

What we claim is:

1. Litter for animals, comprised primarily of defibrated straw material, wherein an individual blade of straw is broken down parallel to a longitudinal direction of a fiber of the blade, wherein said straw material has been compressed or compacted into pellets or briquettes.

2. A method for producing lifter for animals, including the steps of:
   defibrating straw material to straw fibers or straw fiber structures by breaking down an individual blade of straw parallel to a longitudinal direction of a fiber of said blade; and
   compacting the thus rendered straw material into pellets or briquettes.

3. A method according to claim 2, wherein prior to said compacting step, dusty straw material that occurs during said defibrating step is separated off.

4. A method according to claim 2, wherein prior to said compacting step, dusty material that is formed during said defibrating step and that has a particle size of up to about $50\mu$ is separated off.

5. A method according to claim 2, wherein dusty material that occurs during the defibrating step and that has a particle size of up to about $250\mu$ is separated off.

6. A method according to claim 2, wherein prior to said compacting step dusty straw material that occurs during said defibrating step and that has a particle size of up to about $500\mu$ is separated off.

7. A method according to claim 2, wherein prior to said defibrating step said straw is dried to a water content of 8–14%.

8. An method according to claim 2, wherein said defibrated straw material primarily has a maximum dimension as taken perpendicular to a longitudinal direction of fibers of 4 mm.

9. A method according to claim 2, wherein said defibrated straw material primarily has a maximum dimension as taken perpendicular to a longitudinal direction of fibers of 2 to 2.5 mm.

10. A method according to claim 2, wherein said defibrated straw material predominately comprises fibers or fiber structures that have a length of up to 100 mm.

11. A method according to claim 2, wherein said defibrated straw material predominately comprises fibers or fiber structures that have a length of up to 60 mm.

12. A method according to claim 2, wherein all but a small residue of dusty or finely ground straw material that occurs during said defibrating step is separated off prior to said compacting step, wherein said residue acts as a bonding agent during said compacting step.

* * * * *

UNITED STATES PATENT AND TRADEMARK OFFICE
CERTIFICATE OF CORRECTION

PATENT NO.    : 6,349,674 B1
DATED         : February 26, 2002
INVENTOR(S)   : Gaese et al.

It is certified that error appears in the above-identified patent and that said Letters Patent is hereby corrected as shown below:

<u>Title page,</u>
Item [73], should read as follows: -- [73]    Assignee:    Raiffeisen Waren-Zentrale Rhein-Main e.G. --

Signed and Sealed this

Fifteenth Day of October, 2002

Attest:

JAMES E. ROGAN
Attesting Officer    *Director of the United States Patent and Trademark Office*